March 20, 1934.  H. RÖSENER  1,951,677
HOT BLAST SLUICE VALVE
Filed March 12, 1930  2 Sheets-Sheet 1

Inventor:
Heinrich Rösener
B. Singer, Atty

March 20, 1934.   H. RÖSENER   1,951,677

HOT BLAST SLUICE VALVE

Filed March 12, 1930   2 Sheets-Sheet 2

Inventor:
Heinrich Rösener
B. Singer, Atty.

Patented Mar. 20, 1934

1,951,677

UNITED STATES PATENT OFFICE 1,951,677

HOT-BLAST SLUICE VALVE

Heinrich Rösener, Duisburg-Meiderich, Germany

Application March 12, 1930, Serial No. 435,378

5 Claims. (Cl. 251—168)

The sluice valves used in blast-furnace service and chiefly in the ducts between the Cowper hot-blast stoves and the blast furnaces are exposed in operation to unfavorable influences of the most varied description. Foremost, the high temperatures set up stresses in the material of the sluice valves, causing the valve casings, valve rings and connecting flanges to warp. In spite of the provision of water-cooling for these valves, and using materials particularly resistant to high temperatures, such as copper, leakages, particularly in the parts bolted together, cannot be prevented. Frequently, however, the stresses in the materials are so considerable that even cracks occur in the casing parts and valve rings, thus rendering them useless for further employment.

The leading idea, on which the invention is based, is to make all individual parts of the sluice valve, such as casing and valve ring in one piece so as to obtain as few joints as possible and then to so assemble the individual parts that each has the possibility of expanding, provision being made to render all joints tight by a special sealing device. This sealing device is so constructed that it is at the same time positioned with the valve ring in the valve casing, while, on the other hand, it is able to adapt itself to all irregularities. Particular value has been attached to the construction and arrangement of this sealing device, provision being made, on the one hand, to constantly cool it by a current of cold air, while, on the other hand, it is so arranged from the outset as to be protected against the direct influence of the hot blast.

Figure 1:
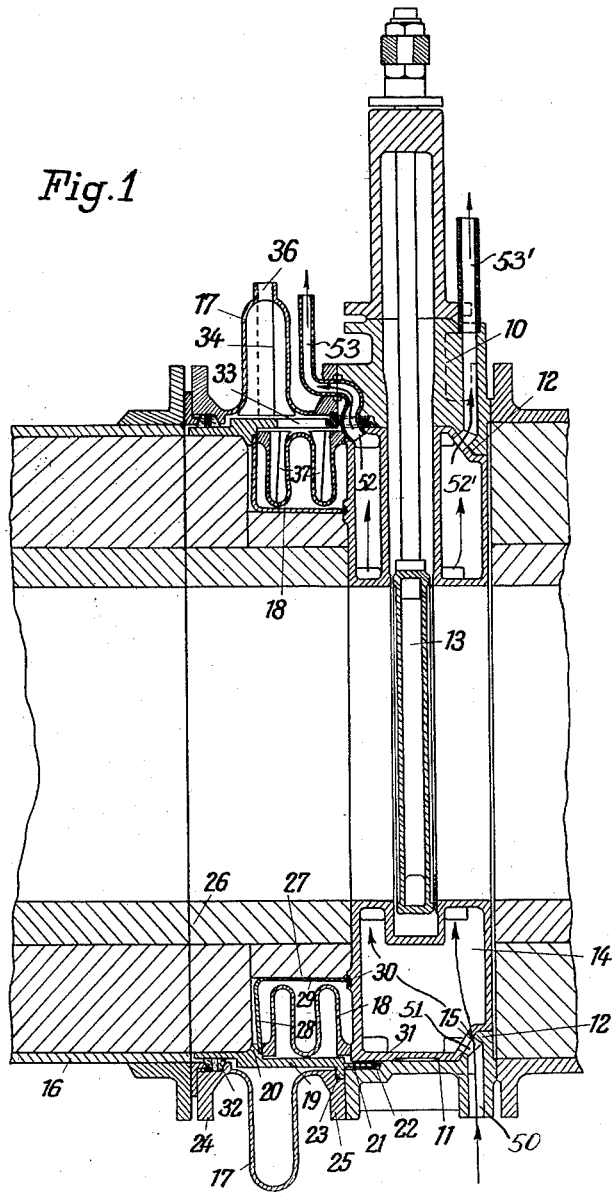
Figure 2:
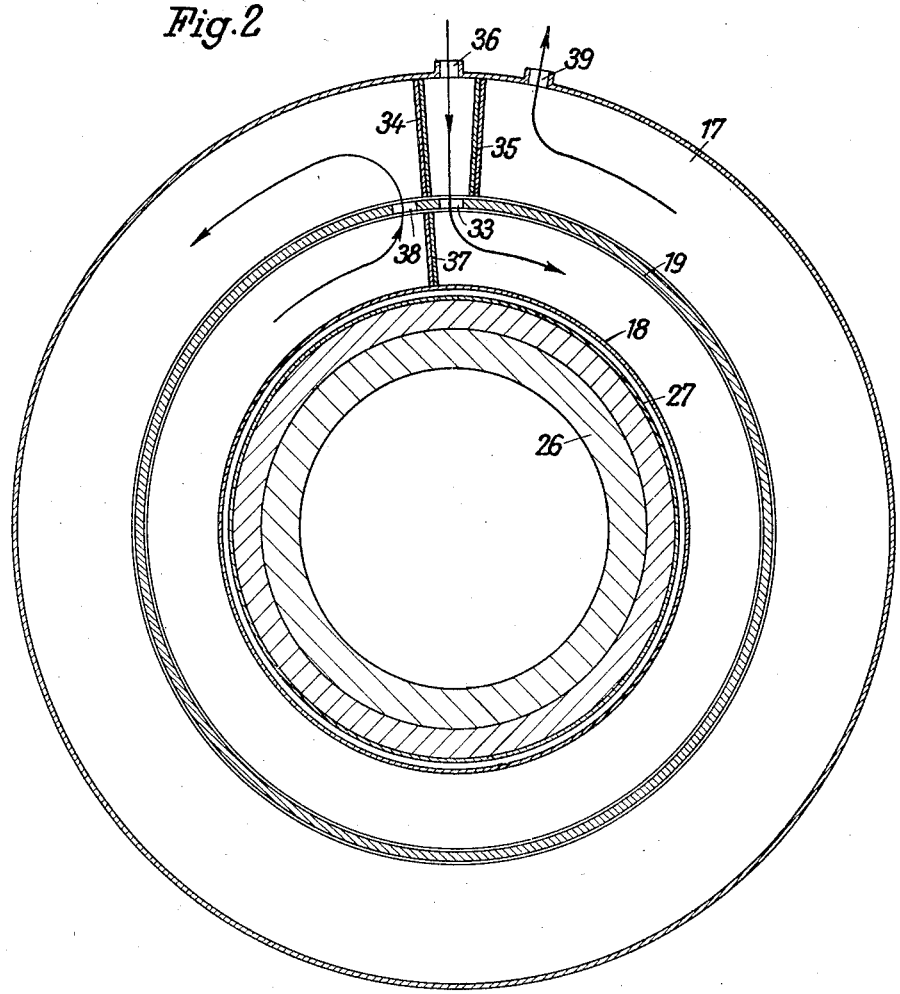
Figure 3:
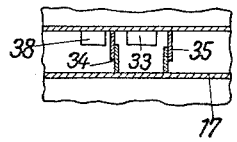

In the accompanying drawings Fig. 1 is a longitudinal section through the valve, and Fig. 2 a cross section through the sealing device, Fig. 3 showing a section of a detail.

The valve casing 10, a one-piece casting, is provided with a centrally disposed, circular opening 11 in which a shoulder 12 similar to an ordinary valve seating is arranged on one side. The valve ring 14, which forms the guide for the gate 13, is inserted in the opening 11, and has a machined face 15 which bears against the seating or shoulder 12. The said valve ring is provided with the usual cooling water chambers one of which is provided with an intake port 51 which communicates with the nipple 50 of the valve casing 10 and the other is provided with discharge ports 52, 52' which respectively communicate with ducts 53, 53' so that cooling water can be caused to circulate through the said chambers as will be understood. A sealing device consisting of two compensators 17 and 18 is interposed between the hot-blast duct 16 and the valve. The two compensators form locally distinct structures, each constituting an encircling body, one of them 18 being disposed concentrically to the other 17. The compensators are separated by a short length of pipe 19 which carries a shoulder 20 encircling the inside. The recessed portion 21 of the pipe 19 engages with a groove 22 formed in the valve casing and the valve ring 14, the pipe 19 being positioned by means of a collar 23 likewise of circular form which fits between the flange of the compensator 17 and that of the valve casing.

The compensator 18, which is mounted with a certain amount of spring, and presses with one end against the slide ring 14, bears against the collar 20 with its other end, the slide ring 14 in its turn bearing against the seating 12. A special advantage lies in that the side faces of the valve ring 14 form completely closed circular surfaces exactly parallel one to the other so that, on the one hand, provision is made for the slide ring 14 bearing at all points on the seating 12, while, on the other hand, an uninterrupted, circular sealing surface is obtained for the compensator 18. The compensator 17 is located on the outer surface of the pipe 19 and is connected by means of its flange 24 with the hot air duct 16 and is connected by means of its flange 25 with housing or casing 10. In this manner a tight joint is obtained between the valve and the hot-blast duct, such joint adapting itself to the irregularities brought about by the variations in the temperature.

In order to protect the compensators from the action of the hot-blast current, and to ensure greatest security of the joint, the compensators are from the outset mounted so far outside as to allow their being protected by a ring of fire-resisting brickwork 26. Any hot air leaking through the interstices of the brickwork 26 is prevented from coming in contact with the compensator 18 by the provision of a protecting angular-shaped hood 27, one arm 28 of which has a certain amount of spring, and fits between the compensator 18 and the shoulder 20, while the other arm 29 engages at its edge in an annular sealing groove 30 provided in the valve ring 14. Packing 31 is likewise provided at the end of the groove 22 formed by the slide casing 10 and the valve ring 14, such packing being pressed apart by the recessed portion 21 of the pipe 19, thereby preventing the entry of hot blast into the compensators from this side. Furthermore, the compensators are also safeguarded on the opposite side against the ingress of hot blast by the provision of a stuffing-box 32 between the compensator flange and the pipe 19.

As the temperature on the outside surfaces of the ducts is still comparatively high notwithstanding the protective brickwork, and, on the other hand, the compensators are susceptible to overheating, so that their springy elasticity is impaired, means are provided for cooling them by cold air. The cooling arrangement may be explained by reference to Fig. 2 which is a cross section through the compensators. The compensators 17 and 18 are separated by the pipe 19. In the compensator 17 guide plates 34 and 35, which conduct the cold air current admitted to the compensator 18 through the branch piece 36, are arranged over an opening 33 in the pipe 19. In order not to hinder the tendency of the compensator to expand, the guide plates consist of two loosely overlapping strips of metal plate which are secured to the inner walls of the compensator corrugation. Each corrugation of compensator 18 is likewise furnished with similarly formed guide plates 37 so that the air current flows through the compensator 18 in the direction indicated by the arrow, whence it enters the compensator 17 through the opening 38, passing through the compensator 17 in contra-flow, whence it issues through the opening 39. In this manner the compensator 18, which is chiefly exposed to the high temperature, is fed with the coldest air. The cold air is preferably taken from the cold-blast duct, which is invariably provided in blast-furnace service, while the heated air is led into the hot-blast duct. A further advantage lies in that the ingress of hot blast is counteracted by filling the compensator spaces with cold air from the existing air duct, cold air always having a higher pressure than hot air. As a matter of course, separately produced compressed air may be used.

What I claim is:

1. A valve of the class described, comprising a valve seating ring having water chambers and having flat opposite sides, the outer side being provided with an annular shoulder, a gate guided by and movable in and across the valve seating ring, a casing on the periphery of the valve seating ring and having an annular shoulder bearing against that of the valve seating ring, a blast duct in which said valve seating ring and valve casing are arranged, and a short length of pipe arranged around the duct and having a flange arranged in a groove in the inner side of the valve casing and opposite the valve seating ring.

2. A valve as claimed in claim 1, in which the short length of pipe around the duct and bearing between the valve casing and valve seating ring is provided with spaced ports, and including a shoulder on the duct and spaced from the valve casing, an outer elastic compensator forming an annular duct and arranged between and bearing against said shoulder and the valve casing and fitted on the outer periphery of the short length of pipe and an inner elastic compensator also forming a duct and bearing against the valve seating ring and against a flange shoulder with which the short length of pipe is provided, said outer compensator having an inlet port for a cooling medium communicating with one of the ports of the short length of pipe, the duct formed by said outer compensator communicating with the other port of the short length of pipe to permit passage of the cooling medium from the inner compensator to the outer compensator, said outer compensator also having a duct for discharge of the cooling medium.

3. A valve as claimed in claim 1, in which the short length of pipe around the duct and bearing against the valve casing and valve sealing ring is provided with spaced ports, and including a shoulder on the duct and spaced from the valve casing, an outer elastic compensator forming an annular duct and arranged between and bearing against said shoulder and the valve casing and fitted on the outer periphery of the short length of pipe and an inner elastic compensator also forming a duct and bearing against the valve seating ring and against a flange shoulder with which the short length of pipe is provided, said outer compensator having an inlet port for a cooling medium communicating with one of the ports of the short length of pipe, the duct formed by said outer compensator communicating with the other port of the short length of pipe to permit passage of the cooling medium from the inner compensator to the outer compensator, said outer compensator also having a duct for discharge of the cooling medium, the said inner compensator being transversely corrugated to provide annular ducts therearound.

4. A valve as claimed in claim 1, in which the short length of pipe around the duct and bearing against the valve casing and valve seating ring is provided with spaced ports, and including a shoulder on the duct and spaced from the valve casing, an outer elastic compensator forming an annular duct and arranged between and bearing against said shoulder and the valve casing and fitted on the outer periphery of the short length of pipe and an inner elastic compensator also forming a duct and bearing against the valve seating ring and against a flange shoulder with which the short length of pipe is provided, said outer compensator having an inlet port for a cooling medium communicating with one of the ports of the short length of pipe, the duct formed by said outer compensator communicating with the other port of the short length of pipe to permit passage of the cooling medium from the inner compensator to the outer compensator, said outer compensator also having a duct for discharge of the cooling medium, the walls of the outer compensator having laterally extending flanges on their opposing sides between which flanges the inlet port of the short length of pipe is arranged.

5. A valve as claimed in claim 1, in which the short length of pipe around the duct and bearing against the valve casing and valve seating ring is provided with spaced ports, and including a shoulder on the duct and spaced from the valve casing, an outer elastic compensator forming an annular duct and arranged between and bearing against said shoulder and the valve casing and fitted on the outer periphery of the short length of pipe and an inner elastic compensator also forming a duct and bearing against the valve seating ring and against a flange shoulder with which the short length of pipe is provided, said outer compensator having an inlet port for a cooling medium communicating with one of the ports of the short length of pipe, the duct formed by said outer compensator communicating with the other port of the short length of pipe to permit passage of the cooling medium from the inner compensator to the outer compensator, said outer compensator also having a duct for discharge of the cooling medium and a hood in which the inner compensator is arranged, said hood being of L-shaped cross section, one of its webs bearing between the inner compensator and the inner shoulder or flange of the short length of pipe, the other web bearing at its edge in an annular groove with which the valve ring is provided at its rear wall.

HEINRICH ROSENER.